(12) United States Patent
Di Bernardo et al.

(10) Patent No.: US 10,397,647 B2
(45) Date of Patent: *Aug. 27, 2019

(54) SYSTEM AND METHOD FOR DELIVERING INTERACTIVE TRIGGER EVENTS

(71) Applicant: AT&T Intellectual Property I, L.P., Atlanta, GA (US)

(72) Inventors: Paul Di Bernardo, Lockport, IL (US); Anthony Bonvolanta, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,305

(22) Filed: Jun. 13, 2018

(65) Prior Publication Data
US 2018/0295417 A1    Oct. 11, 2018

Related U.S. Application Data

(63) Continuation of application No. 15/590,446, filed on May 9, 2017, now Pat. No. 10,021,452, which is a
(Continued)

(51) Int. Cl.
*H04N 21/44* (2011.01)
*H04N 21/81* (2011.01)
*H04N 21/858* (2011.01)
*H04N 21/488* (2011.01)
*H04N 21/431* (2011.01)
(Continued)

(52) U.S. Cl.
CPC ... *H04N 21/44016* (2013.01); *H04N 21/2665* (2013.01); *H04N 21/435* (2013.01); *H04N 21/4316* (2013.01); *H04N 21/44008* (2013.01); *H04N 21/4622* (2013.01); *H04N 21/4722* (2013.01); *H04N 21/4725* (2013.01); *H04N 21/4882* (2013.01); *H04N 21/4884* (2013.01); *H04N 21/812* (2013.01); *H04N 21/8166* (2013.01); *H04N 21/8586* (2013.01)

(58) Field of Classification Search
CPC combination set(s) only.
See application file for complete search history.

(56) References Cited

U.S. PATENT DOCUMENTS 8,160,064 B2    4/2012    Kokernak et al.
8,255,952 B2    8/2012    Boylan, III et al.
(Continued)

*Primary Examiner* — Justin E Shepard
(74) *Attorney, Agent, or Firm* — Guntin & Gust, PLC; Andrew Gust

(57) ABSTRACT

Aspects of the subject disclosure may include, for example, a method in which a media processor identifies a first key and a second key associated with media content received over a network, and prepares a display object according to the first key that includes a selectable object. The media processor transmits a request to a remote server including the second key; the server returns first additional content and control code associated with the second key. The media processor merges the first additional content with the display object to produce an overlay for presentation with the media content in accordance with the control code. The overlay is associated with a provider of the first additional content; the first key is independent of the provider, and the second key corresponds to the provider. Other embodiments are disclosed.

20 Claims, 7 Drawing Sheets

Related U.S. Application Data continuation of application No. 15/288,154, filed on Oct. 7, 2016, now Pat. No. 9,693,096, which is a continuation of application No. 15/017,143, filed on Feb. 5, 2016, now Pat. No. 9,491,506, which is a continuation of application No. 14/508,281, filed on Oct. 7, 2014, now Pat. No. 9,288,533.

(51) Int. Cl.
*H04N 21/435* (2011.01)
*H04N 21/462* (2011.01)
*H04N 21/4722* (2011.01)
*H04N 21/2665* (2011.01)
*H04N 21/4725* (2011.01)

(56) References Cited

U.S. PATENT DOCUMENTS

| | | |
|---|---|---|
| 8,434,103 B2 | 4/2013 | Tsuchida et al. |
| 8,539,540 B2 | 9/2013 | Zenoni |
| 8,613,020 B2 | 12/2013 | Knudson et al. |
| 8,793,742 B2 | 7/2014 | Macrae et al. |
| 10,021,452 B2 * | 7/2018 | Di Bernardo ........ H04N 21/812 |
| 2003/0095208 A1 | 5/2003 | Chouraqui et al. |
| 2007/0300280 A1 | 12/2007 | Turner et al. |
| 2009/0210901 A1 | 8/2009 | Hawkins et al. |
| 2010/0153990 A1 | 6/2010 | Ress et al. |
| 2010/0175080 A1 | 7/2010 | Yuen et al. |
| 2012/0084807 A1 | 4/2012 | Thompson et al. |
| 2013/0159856 A1 | 6/2013 | Ferren |
| 2016/0156971 A1 | 6/2016 | Di Bernardo et al. |
| 2017/0026698 A1 | 1/2017 | Di Bernardo et al. |
| 2017/0245006 A1 | 8/2017 | Di Bernardo et al. |

* cited by examiner

200

300

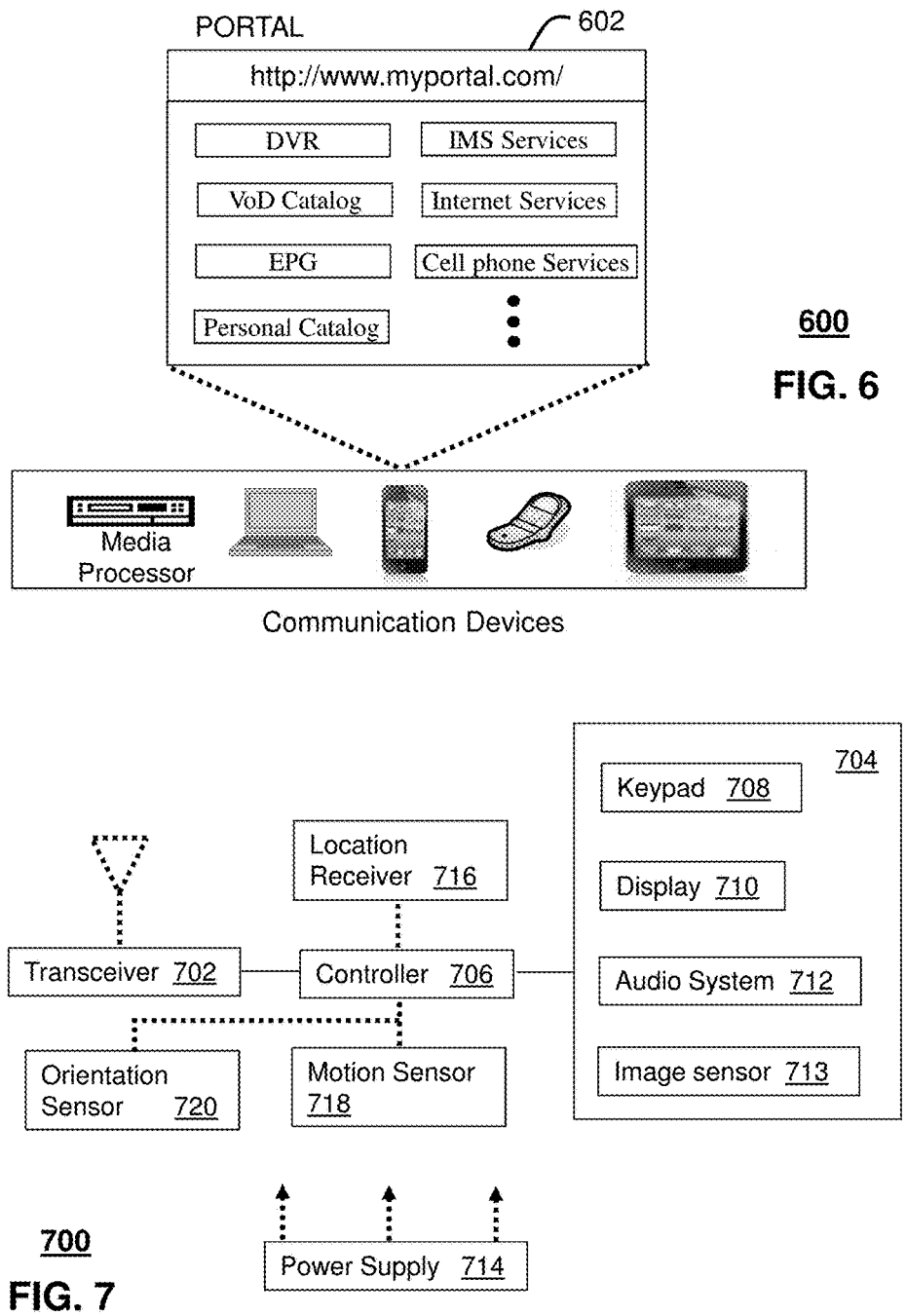

SYSTEM AND METHOD FOR DELIVERING INTERACTIVE TRIGGER EVENTS

CROSS-REFERENCE TO RELATED APPLICATIONS

This application is a continuation of U.S. application Ser. No. 15/590,446, filed May 9, 2017, which is a continuation of U.S. application Ser. No. 15/288,154, filed Oct. 7, 2016 (now U.S. Pat. No. 9,693,096), which is a continuation of U.S. application Ser. No. 15/017,143, filed Feb. 5, 2016 (now U.S. Pat. No. 9,491,506), which is a continuation of U.S. application Ser. No. 14/508,281, filed Oct. 7, 2014 (now U.S. Pat. No. 9,288,533), which are incorporated herein by reference in their entirety.

FIELD OF THE DISCLOSURE

The subject disclosure relates to a system and method for delivering interactive trigger events.

BACKGROUND

Video content received from a content provider over a network and presented on a display device using a media processor, such as a set top box (STB), can include overlays having interactive components. An overlay is typically resident on the STB and deployed in response to a signal from the content provider.

BRIEF DESCRIPTION OF THE DRAWINGS

Reference will now be made to the accompanying drawings, which are not necessarily drawn to scale, and wherein:

FIG. 6 depicts an illustrative embodiment of a web portal for interacting with the communication systems of FIGS. 4-5;

FIG. 7 depicts an illustrative embodiment of a communication device; and

DETAILED DESCRIPTION

Figure 1:
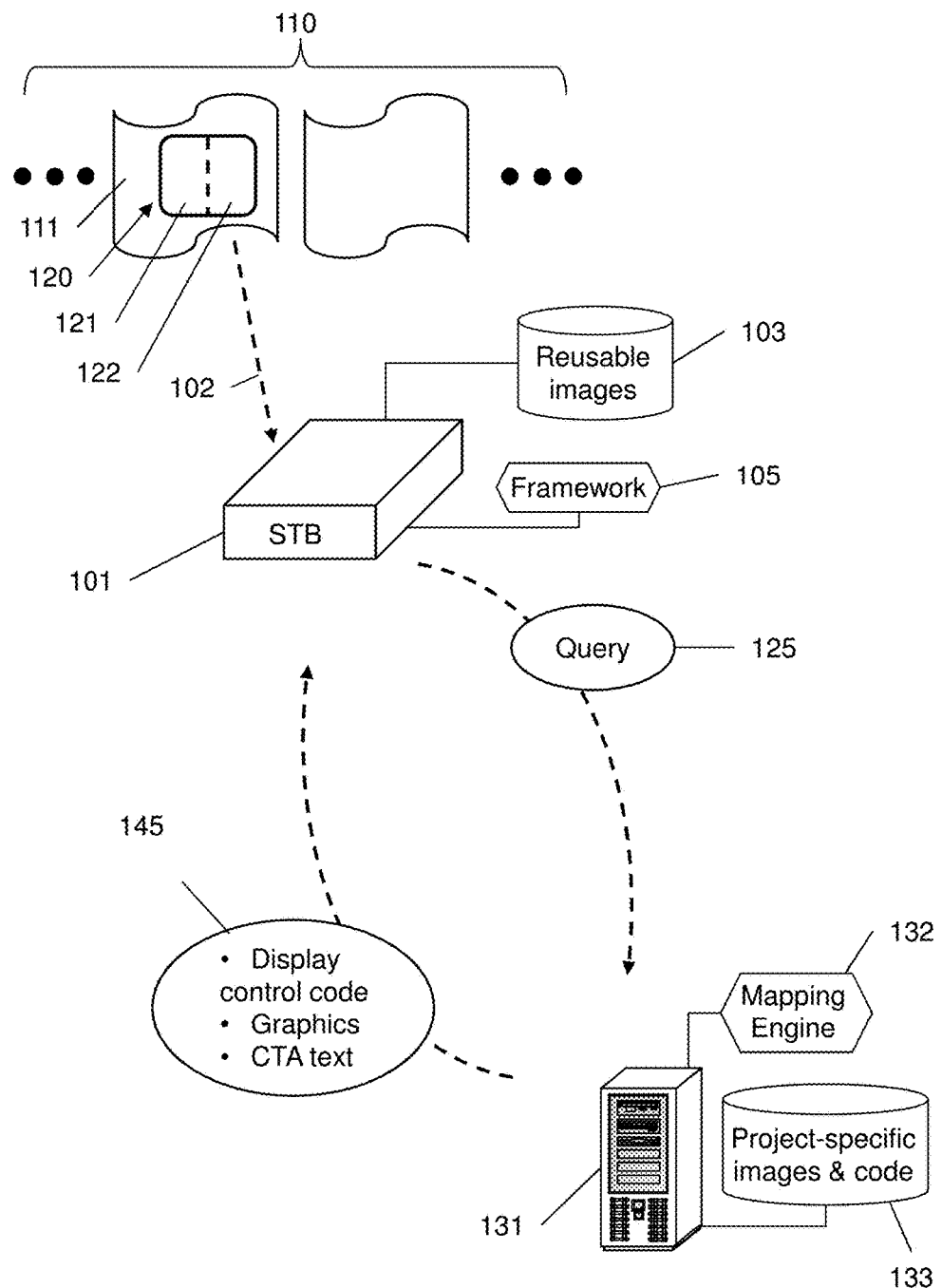
FIG. 1 schematically illustrates a system for providing an interactive overlay, in accordance with an embodiment of the disclosure.

The subject disclosure describes, among other things, illustrative embodiments for providing interactive triggered overlays for video content. Other embodiments are described in the subject disclosure.

One or more aspects of the subject disclosure include a method in which a set top box (STB), communicating with a television network, has installed on it a software framework for an interactive trigger and reusable images. The STB responds to a trigger key embedded in incoming video content by activating the framework and retrieving control code and graphics (specific to the advertising overlay trigger to be presented) from a content server in the cloud. This permits on-demand generation and deployment of interactive overlays.

One embodiment of the subject disclosure includes a machine-readable storage device comprising instructions which, when executed by a processor, cause the processor to perform operations. The operations comprise receiving video content for display on a display device and identifying a key provided in the video content; the key includes a first key portion and a second key portion. The operations also comprise preparing a display object based on image information in accordance with the first key portion, and transmitting a request to a remote content server in accordance with the second key portion. The operations further comprise receiving first additional content and a control code from the content server in response to the request, and merging the first additional content with the display object to produce an overlay for display with the video content on the display device in accordance with the control code; the overlay includes a selectable object. The operations also comprise causing display of the overlay at the display device, and causing display of second additional content at the display device in response to an input corresponding to selection of the selectable object. The image information corresponds to a plurality of images, and the overlay is associated with a provider of the first additional content. The first key portion is independent of an identity of the provider, and the second key portion corresponds to the identity of the provider.

One embodiment of the subject disclosure includes a media processor comprising a memory to store instructions and a controller coupled to the memory. The controller, responsive to executing the instructions, performs operations. The operations comprise receiving media content over a network for display on a display device and identifying a key associated with the media content; the key includes a first key portion and a second key portion. The operations also comprise preparing a display object in accordance with the first key portion; the display object includes a selectable object, and transmitting a request to a remote content server, the request including the second key portion. The operations also comprise receiving, in response to the request, first additional content and display control code; and merging the first additional content with the display object to produce an overlay for display with the media content on the display device in accordance with the display control code. The operations further comprise causing display of the overlay at the display device and, in response to an input corresponding to selection of the selectable object, causing display of second additional content at the display device. The overlay is associated with a provider of the first additional content. The first key portion is independent of an identity of the provider, and the second key portion corresponds to the identity of the provider.

One embodiment of the subject disclosure includes a method comprising receiving, by a media processor comprising a controller, media content over a network for presentation on a media presentation device coupled to the media processor. The method also comprises identifying a key associated with the media content; the key includes a first key portion and a second key portion. The operations further comprise preparing a display object in accordance with the first key portion, the display object including a selectable object; and transmitting a request to a remote computing device, the request including the second key portion. The method also comprises receiving, by the media processor in response to the request, first additional content and control code associated with the second key portion, and merging the first additional content with the display object to produce an overlay for presentation with the media content on the media presentation device in accordance with the control code. The method further comprises causing presentation of the overlay at the media presentation device. The overlay is associated with a provider of the first additional content; the first key portion is independent of an identity of the provider, and the second key portion corresponds to the identity of the provider.

FIG. 1 schematically illustrates a system 100 for providing an interactive overlay with media content, in accordance with an embodiment of the disclosure. In this embodiment, a media processor (represented by a STB 101) receives a signal 102 that comprises media content from a content provider, delivered over a network (not shown). In this embodiment, the media content includes a sequence of video frames 110.

In addition to a video image, each frame can include information that can be processed by the STB for various purposes. For example, video frames 110 can include closed captioning (CC) information that might be displayed with the video image. In this embodiment, frame 111 includes advertising content and has additional encoded information 120, referred to herein as a "trigger key." The appearance of the trigger key in signal 102 triggers the STB to invoke executable code for building an overlay for presenting on the frame 111. In this embodiment, frame 111 has a closed captioning line (e.g. CC line 4) including characters 121, 122, referred to herein as first and second trigger key portions respectively. In this embodiment, trigger key 120 is received at STB 101 with the media content. In response to the first trigger key portion 121, the STB activates software 105, resident on the STB, for deploying an interactive overlay on frame 111. Software 105 is referred to herein as "framework" software since its execution provides overlay features that are independent of the identity of the advertiser or the visual/textual content of the overlay. The framework software can direct the STB to retrieve from storage 103 graphical objects (e.g. backgrounds and buttons) that are reusable; that is, objects that can appear in overlays on different advertisements, in different advertising campaigns, and/or by different advertisers.

The second trigger key portion 122 is included in a query 125 transmitted from the STB 101 to a remote content server 131. The remote content server uses the second trigger key portion and passes back the control code and associated images to the framework along with control code. The control code provides instructions that permits the overlay to be built with graphics sent from the content server 131 and resident generic graphics from storage 103; the completed overlay is then presented on the display device.

In this embodiment, content server 131 is located in the cloud and is accessible to STB 101 via a network. Content server 131 includes a mapping engine 132 that can map trigger key portion 122 to various components that are specific to the desired overlay. For example, based on trigger key portion 122 the mapping engine 132 can identify a specific graphic (e.g. an advertiser's logo) and/or a specific line of text to be inserted in the overlay with the graphic (e.g. a "call to action" or CTA, prompting the viewer of the overlay). In addition, mapping engine 132 can retrieve specific control code for the overlay, controlling (for example) the size, shape, color and/or position of the overlay displayed on the frame. In this embodiment, the objects and control code that are specific to the overlay are stored on storage device 133 which is accessible to server 131. In this embodiment, deployment of an overlay can be considered part of a "project" by the advertiser; accordingly, objects and code stored at storage device 133 may be termed "project-specific."

In an embodiment, the project-specific control code also includes instructions for presenting additional content if a viewer of the interactive overlay responds to the call to action (for example, by selecting a button included in the overlay). In a specific embodiment, the project-specific control code includes a uniform resource locator (URL) pointing to the additional content, which accordingly is automatically displayed when the user selects the button.

Content server 131 sends a reply 145 to STB 101 that includes the project-specific components for the overlay, in accordance with the second trigger key portion 122. The STB can then merge the framework that includes the reusable images with the project-specific images and control code to generate the overlay for the frame 111. The overlay can then be presented with frame 111 and with succeeding frames that include the trigger key 120.

Alternatively, the overlay can be sustained over multiple frames with a single introduction of the trigger key 120. In an embodiment, the control code can include an instruction that the overlay is to be presented for a specific time period or a specific number of frames. Once the overlay is launched on the display device, it can remain displayed until the specified time expires or other action is taken by the user (e.g., a channel change, or an input to exit the overlay). In another embodiment, the overlay remains displayed until an exit key in a subsequent video frame is received.

Figure 2:
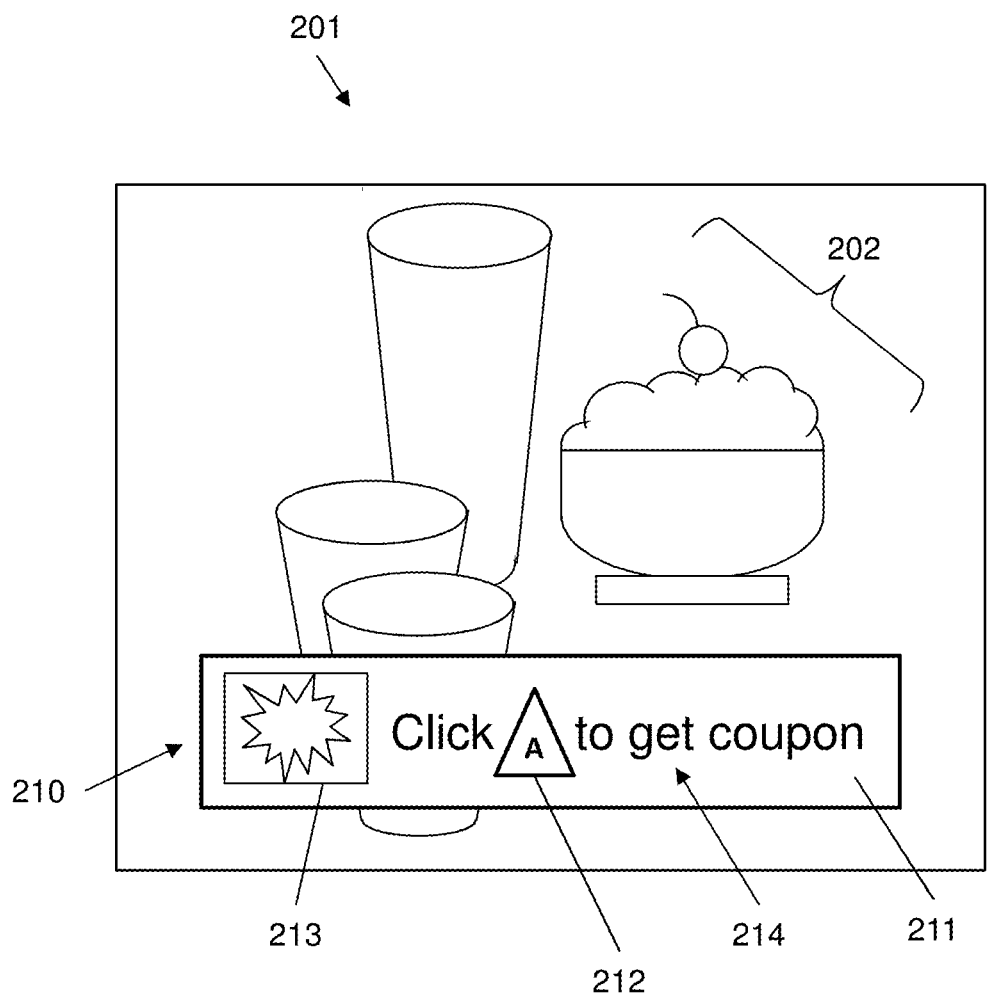
FIG. 2 depicts an illustrative embodiment of a presentation of content that includes an interactive overlay.

FIG. 2 depicts a frame of advertising content and an overlay generated in accordance with an embodiment 200 of the disclosure. Frame 201, as received at the STB 101 over the network, includes content with images 202. Overlay 210, displayed over the images 202, has a background 211 and a button 212 retrieved from storage 103 (in accordance with the first trigger key portion 121). Overlay 210 also has a graphic 213 and a CTA 214 retrieved from storage 133 and transmitted from server 131 in response to query 105 (in accordance with the second trigger key portion 122).

It will be appreciated that overlay 210 is generated in a run-time environment, as the STB 101 processes the media content signal 102 for display. Rather than storing a limited inventory of completed overlays, the STB can generate a wide variety of overlays to meet the requirements of a particular project.

In an embodiment, the STB 101 periodically receives an updated list of projects and a corresponding update of the set of reusable images. The overlay frameworks that can be generated therefore vary with time. In a particular embodiment, an update to the project list and the reusable images is performed once every 1-6 months, while the project-specific overlay components can be changed daily by sending new content and/or control code to server 131.

Figure 3:
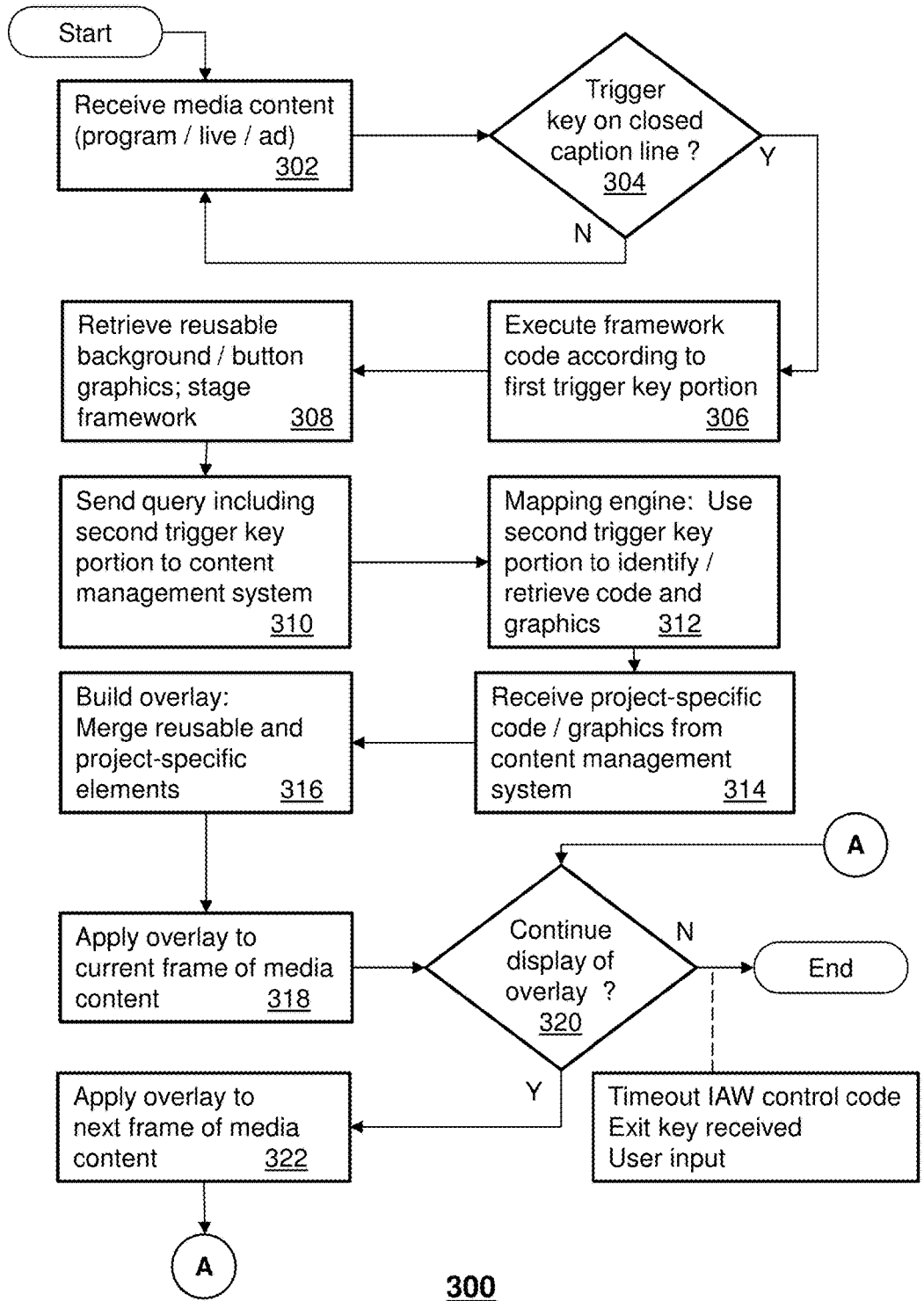
FIG. 3 is a flowchart illustrating a method used in portions of the system described in FIG. 1.

FIG. 3 is a flowchart showing a method 300 for generating an overlay for media content, in accordance with an embodiment of the disclosure. The STB receives media content over the network (step 302); the content can be a prerecorded program, a live program or advertising. The STB determines (step 304) whether trigger keys are present in a frame (for example on CC line 4). If so, the STB executes the framework software 105 (step 306) according to the first trigger key. The STB retrieves reusable images (step 308) from storage 103. At this point a framework for the overlay is staged at the STB (that is, ready for components that will distinguish the overlay as representing a particular project).

The STB sends a query including the second trigger key to a content management system that includes a content server, a mapping engine and storage for project-specific images and control code (step 310). The mapping engine uses the second trigger key to retrieve the images and code specific to the overlay being generated (step 312). As noted above, the code can include display control code for displaying the overlay and/or a URL for displaying additional content in response to user selection of a button in the overlay. The STB receives the project-specific components (step 314) and merges those components with the staged framework to build the overlay (step 316).

In an embodiment, the overlay is displayed on the media content over multiple frames. After the overlay is generated and displayed on the first frame (that is, the frame where the trigger keys were first encountered), the overlay can be repeated while the key is present in succeeding frames. If the next frame includes the trigger key found in the current frame, or if the control code provides for continued display of the overlay (step 320), the overlay is applied to the next frame also (step 322). Otherwise the overlay is no longer displayed. In an embodiment, an overlay is presented with display of a television advertising spot so that the overlay persists across the frames of the advertising spot up until a predetermined time (e.g. 5 seconds) before the end of the advertising display. In other embodiments, the overlay is displayed until expiration of a time period in accordance with the control code, or until an exit key is received in a subsequent frame. As noted above, the display of the overlay can also be terminated in response to a user input, e.g. a channel change.

Figure 4:
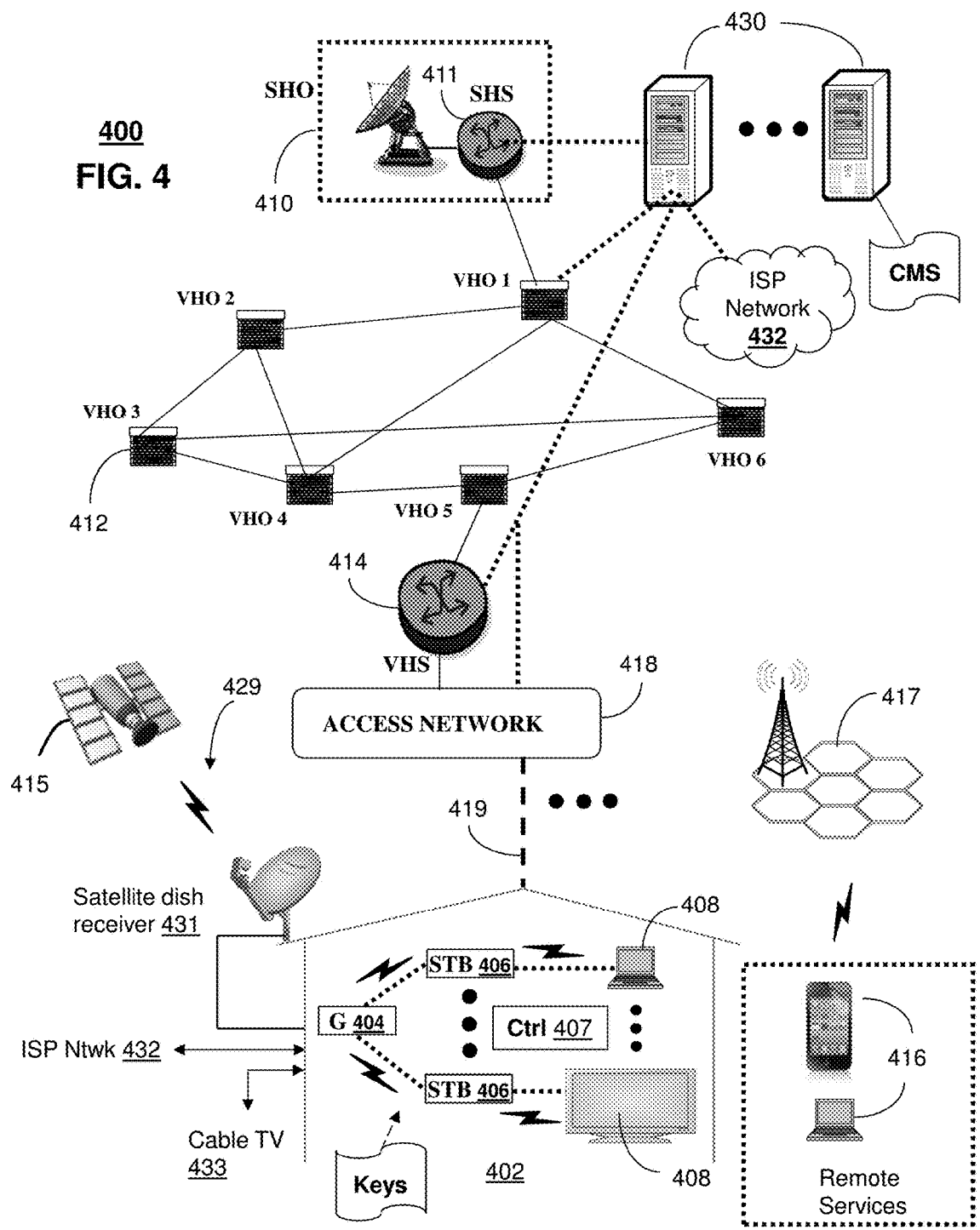
FIGS. 4-5 depict illustrative embodiments of communication systems that provide media services including video content where overlays are used.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4. In particular, system 400 can include a media processor comprising a memory to store instructions and a controller coupled to the memory. The controller, responsive to executing the instructions, performs operations. The operations comprise receiving media content over a network for display on a display device, identifying a first key and a second key associated with the media content, and preparing a display object in accordance with the first key; the display object includes a selectable object. The operations also comprise transmitting a request to a remote content server, the request including the second key; receiving, in response to the request, first additional content and display control code; and merging the first additional content with the display object to produce an overlay for display with the media content on the display device in accordance with the display control code. The operations further comprise causing display of the overlay at the display device and, in response to an input corresponding to selection of the selectable object, causing display of second additional content at the display device. The overlay is associated with a provider of the first additional content. The first key is independent of an identity of the provider, and the second key corresponds to the identity of the provider.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a content management system (herein referred to as CMS 430). The CMS 430 can use computing and communication technology to provide the project-specific components of the overlay, which can include among other things, project-specific graphics, display control code, and/or a URL pointing to additional content. For instance, CMS 430 can perform the functions described in accordance with method 300. The media processors 406 and wireless communication devices 416 can be provisioned with software functions to utilize the services of CMS 430. For instance, the functions of media processors 406 can be similar to the functions described for media processors of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
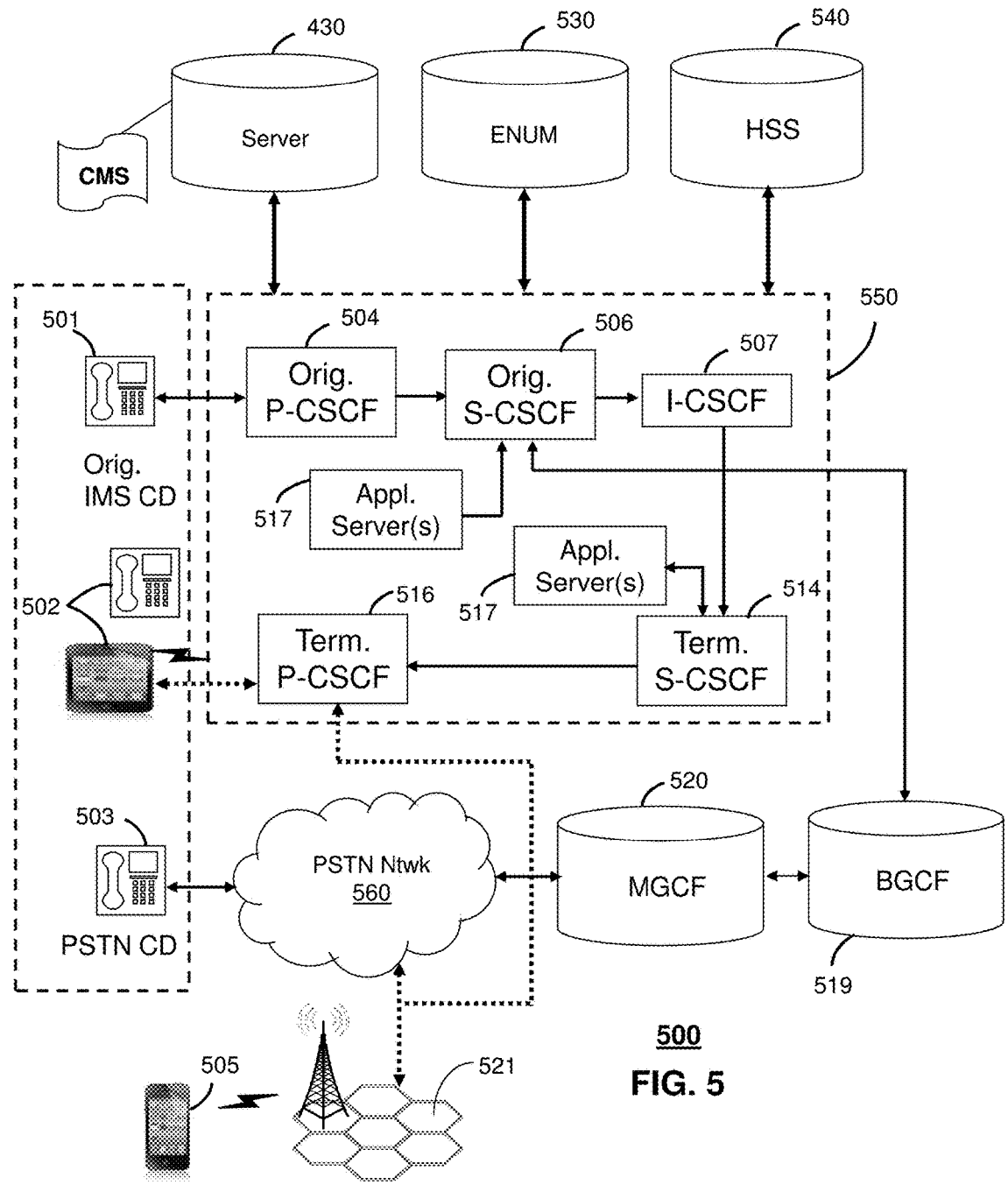

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. In particular, system 500 can be configured to perform a method comprising receiving, by a media processor comprising a controller, media content over a network for presentation on a media presentation device coupled to the media processor. The method also comprises identifying a first key and a second key associated with the media content; preparing a display object in accordance with the first key, the display object including a selectable object; and transmitting a request to a remote computing device, the request including the second key. The method also comprises receiving, by the media processor in response to the request, first additional content and control code associated with the second key, and merging the first additional content with the display object to produce an overlay for presentation with the media content on the media presentation device in accordance with the control code. The method further comprises causing presentation of the overlay at the media presentation device. The overlay is associated with a provider of the first additional content; the first key is independent of an identity of the provider, and the second key corresponds to the identity of the provider.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The CMS 430 of FIG. 4 can be operably coupled to communication system 500 for purposes similar to those described above. CMS 430 can provide services to the CDs 501, 502, 503 and 505 of FIG. 5 similar to the functions described for server 131 of FIG. 1 in accordance with method 300 of FIG. 3. CDs 501, 502, 503 and 505 can be adapted with software to utilize the services of CMS. CMS 430 can be an integral part of the application server(s) 517, which can be adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100, communication system 400, and/or communication system 500. The web portal 602 can be used for managing services of system 100 and communication systems 400-500. A web page of the web portal 602 can be accessed by a Uniform Resource Locator (URL) with an Internet browser using an Internet-capable communication device such as those described in FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications to adapt these applications as may be desired by subscribers and/or service providers of system 100 and communication systems 400-500. Service providers can log onto an administrator account to provision, monitor and/or maintain system 100 and/or CMS 430.

FIG. 7 depicts an illustrative embodiment of a communication device 700. Communication device 700 can serve in whole or in part as an illustrative embodiment of the devices depicted in FIGS. 4-5. Communication device 700 in whole or in part can represent any of the communication devices described in FIGS. 4-5] and can be configured to perform portions of method 300 of FIG. 3].

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the system of FIG. 1 or in communication systems 400-500 of FIGS. 4-5 such as a gaming console and a media player.

The communication device 700 shown in FIG. 7 or portions thereof can serve as a representation of one or more of the devices of system 100, communication system 400, and communication system 500.

Upon reviewing the aforementioned embodiments, it would be evident to an artisan with ordinary skill in the art that said embodiments can be modified, reduced, or enhanced without departing from the scope of the claims described below. For example, advertisements can be presented via the STB using an advertising decision system (ADS) that appends the trigger keys to the closed captioning portion of the advertising content frames. In another embodiment, an advertisement with closed captioning is injected into live programming, and an overlay is presented with the advertisement in accordance with the embedded trigger keys. In a further embodiment, the live programming can have a closed captioned portion including the trigger keys, so that an overlay is presented over the live content. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
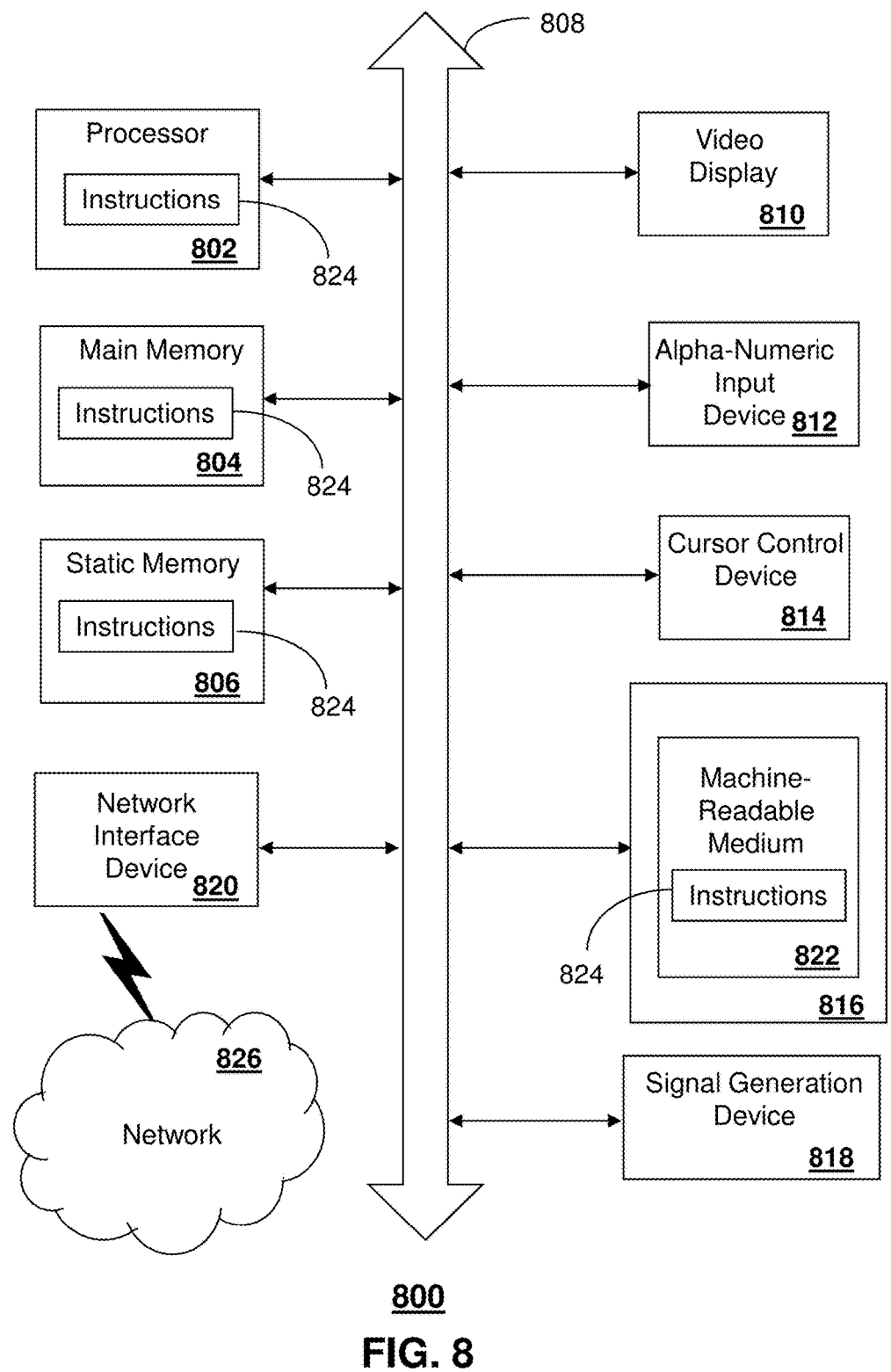
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the CMS 430, the media processor 406, and other devices of FIGS. 1, 4 and 5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores executable instructions that, when executed by the processing system, facilitate performance of operations comprising:
   receiving media content over a network, the media content including a first key portion and a second key portion;
   retrieving, in accordance with the first key portion, a reusable graphical object;
   receiving, in accordance with the second key portion, first additional content including a control code; and
   merging the first additional content with the reusable graphical object, in accordance with the control code, to produce an overlay for display with the media content.

2. The device of claim 1, wherein the first additional content is obtained in response to a query sent by the processing system to a content server, wherein the query includes the second key portion, and wherein the content server retrieves images specific to the overlay, in accordance with the second key portion.

3. The device of claim 1, wherein the first additional content comprises advertising content provided by an advertiser, and wherein the reusable graphical object is reusable in projects of a plurality of different advertisers.

4. The device of claim 3, wherein the first additional content comprises a selectable object and a graphic specific to the advertiser.

5. The device of claim 4, wherein the first additional content comprises text prompting input from equipment of a viewer of the overlay corresponding to selection of the selectable object.

6. The device of claim 5, wherein the control code specifies a location of the overlay on a display of the media content, and wherein the control code specifies a location on the overlay of the graphic, the text, the selectable object, or any combination thereof.

7. The device of claim 5, wherein the control code includes instructions for presenting second additional content responsive to the selection of the selectable object, wherein the instructions include a uniform resource locator for the second additional content.

8. The device of claim 3, wherein the operations further comprise:
   receiving an updated list of projects of the plurality of different advertisers; and
   receiving an updated set of reusable graphical objects associated with the listed projects.

9. The device of claim 1, wherein the operations further comprise displaying the overlay with the media content for a duration according to instructions included in the control code.

10. The device of claim 1, wherein the media content comprises an advertisement and a closed captioning line associated with the advertisement, and wherein the first key portion and the second key portion are provided on the closed captioning line.

11. A method comprising:
   receiving, by a processing system including a processor, media content including a first key portion and a second key portion;
   retrieving, by the processing system and in accordance with the first key portion, a reusable graphical object;
   receiving, by the processing system and in accordance with the second key portion, first additional content including a control code, wherein the first additional content comprises advertising content provided by an advertiser and a graphic specific to the advertiser; and merging, by the processing system, the first additional content with the reusable graphical object, in accordance with the control code, to produce an overlay for display with the media content.

12. The method of claim 11, wherein the reusable graphical object is reusable in projects of a plurality of different advertisers.

13. The method of claim 12, further comprising:
receiving, by the processing system, an updated list of projects of the plurality of different advertisers; and
receiving, by the processing system, an updated set of reusable graphical objects associated with the listed projects.

14. The method of claim 11, wherein the first additional content comprises a selectable object and text prompting input from equipment of a viewer of the overlay corresponding to selection of the selectable object.

15. The method of claim 11, further comprising displaying, by the processing system, the overlay with the media content for a duration according to instructions included in the control code.

16. A machine-readable medium comprising executable instructions that, when executed by a processing system including a processor, facilitate performance of operations comprising:
receiving media content over a network, the media content including a first key portion and a second key portion;
retrieving, in accordance with the first key portion, a reusable graphical object;
receiving, in accordance with the second key portion, first additional content including a control code; and
merging the first additional content with the reusable graphical object, in accordance with the control code, to produce an overlay for display with the media content.

17. The machine-readable medium of claim 16, wherein the first additional content comprises advertising content provided by an advertiser, and wherein the reusable graphical object is reusable in projects of a plurality of different advertisers.

18. The machine-readable medium of claim 16, wherein the first additional content comprises a selectable object and text prompting input from equipment of a viewer of the overlay corresponding to selection of the selectable object.

19. The machine-readable medium of claim 18, wherein the control code includes instructions for presenting second additional content responsive to the selection of the selectable object, wherein the instructions include a uniform resource locator for the second additional content.

20. The machine-readable medium of claim 16, wherein the media content comprises an advertisement and a closed captioning line associated with the advertisement, and wherein the first key portion and the second key portion are provided on the closed captioning line.

* * * * *